United States Patent
Naruse et al.

(12)

(10) Patent No.: US 6,348,542 B1
(45) Date of Patent: Feb. 19, 2002

(54) MULTIPHASE STRUCTURED POLYMER PARTICLES, METHOD OF MANUFACTURING SAME, AND USES THEREOF

(75) Inventors: Tatsuya Naruse; Takao Hoshiba, both of Nakajo-machi; Kazutoshi Terada, Tsukuba; Takashi Yamashita, Tsukuba; Yuichi Katoh, Tsukuba, all of (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/678,735

(22) Filed: Oct. 4, 2000

(51) Int. Cl.$^7$ .......................... C08L 51/04; C08L 27/06
(52) U.S. Cl. ...................... 525/71; 525/85; 525/301; 525/303; 524/504; 526/319
(58) Field of Search .................. 525/71, 85, 301, 525/309; 524/504; 526/319

(56) References Cited

U.S. PATENT DOCUMENTS

| | | |
|---|---|---|
| 3,562,235 A | 2/1971 | Ryan |
| 3,808,180 A | 4/1974 | Owens |
| 3,843,753 A | 10/1974 | Owens |
| 4,730,023 A | 3/1988 | Sato et al. |
| 5,276,092 A * | 1/1994 | Kempner et al. .............. 525/71 |
| 5,306,777 A | 4/1994 | Nogura et al. |
| 5,972,447 A | 10/1999 | Hata et al. |

FOREIGN PATENT DOCUMENTS

| | | |
|---|---|---|
| EP | 0 297 706 | 1/1989 |
| EP | 0 536 935 | 4/1993 |
| GB | 1 332 070 | 10/1973 |
| JP | 5-17654 | 1/1993 |

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

This invention relates to multiphase structured polymer particles comprising at least two rubber component phases (I) formed by copolymerization of monomer mixtures comprising an acrylate ester and a polyfunctional monomer, a thermoplastic resin component phase (II) formed by copolymerization of a monomer mixture comprising a methacrylate ester and other monomers, and satisfying the following conditions (1)–(5). (1) The number average molecular weight of the thermoplastic resin component forming the outermost phase is 30,000 or less. (2) The weight ratio of phase (I)/phase (II) is 30/70–80/20. (3) Of the adjacent phases (1), a specific relation holds regarding the solubility in water of the monomer mixtures forming the nth and n+1th phases. (4) A specific relation holds between the refractive index of phase (I) and the refractive index of phase (II). (5) The average particle size is 150 nm or less. When the multiphase structured polymer particles according to this invention are used alone to form molded products, molded products having excellent transparency and elastic recovery properties can be obtained.

7 Claims, No Drawings

MULTIPHASE STRUCTURED POLYMER PARTICLES, METHOD OF MANUFACTURING SAME, AND USES THEREOF

BACKGROUND OF THE INVENTION

1. Field of the Invention

This invention relates to multiphase structured polymer particles, and relates to a method of manufacturing these multiphase structured polymer particles, and their uses. More specifically, the invention. relates to multiphase structured polymer particles comprising at least two rubber component phases (I) which are mutually adjacent to each other and have different monomer compositions, and a resin phase (II) which has thermoplasticity at least in its outermost part. The invention relates to multiphase structured polymer particles which, if a monomer mixture (i) forming the rubber component phase (I) fulfils specific conditions, are able to exhibit specific functions, i.e., they not only excel in flexibility, but also excel in transparency and elastic recovery properties (excellent permanent set characteristics). It further relates to a method of manufacturing same, and to a molding material and film or sheet comprising. these multiphase structured polymer particles.

2. Description of the Related Art

Multiphase structured polymer particles, also referred to as core-shell type polymers, contain an inner phase of a rubber component and an outermost phase of a thermoplastic resin component part, and are used for the reforming of thermoplastic resins such as polyvinyl chloride, polyester and acrylic resins, etc. Some of them are known to be useful as modifiers to impart toughness (U.S. Pat. Nos. 4,730,023, 3,808,180, 3,843,753, and Japanese Provisional Patent Publication No. 5-17654(1993)).

However, although molded products which excel in flexibility are obtained when these multiphase structured polymer particles used for the purpose of imparting toughness are formed independently, their moldability is poor as there is little thermoplastic resin component which constitutes the outermost phase, and they are therefore not very practical.

If moldability is improved by increasing the thermoplastic resin component of these multiphase structured polymer particles, flexibility is sacrificed, and elastic recovery properties (low permanent set properties) decrease.

Further, it is common in multiphase structured polymer particles to make the refractive index of each phase of the multiphase structured polymer particles coincide in order to improve transparency. However, if the glass transition point of the rubber component phase is lowered in order to recover the flexibility which was sacrificed, it becomes difficult to make the refractive index of each phase coincide, and a good transparency is not obtained.

SUMMARY OF THE INVENTION

It is therefore an object of this invention to provide multiphase structured polymer particles which give a molded product having excellent elastic recovery properties (low permanent set characteristics) and transparency when they are formed into a molded product, while maintaining good moldability. It is another object of this invention to provide a method of manufacturing multiphase structured polymer particles. It is yet another object of this invention to provide molding applications of these multiphase structured polymer particles.

In order to solve the above-mentioned problems, the inventors performed various investigations. It was found that if the molecular weight of the thermoplastic resin component which constitutes the outermost phase of the multiphase structured polymer particles, the average particle size of the particles and the solubility in water of the monomer forming the core component phase satisfied certain conditions, excellent elastic recovery properties and transparency were obtained. Further considerations led to the formulation of the present invention.

One object of this invention as stated hereabove is achieved to provide multiphase structured polymer particles (referred to hereafter in some cases as multiphase structured polymer particles (A)) which:

(1) comprise at least three phases comprising at least two of the following inner rubber component phases (I), and at least one of the following thermoplastic resin component phases (II) in at least the outermost part, wherein (2) the rubber component phases (I) are polymer phases formed by copolymerization of a monomer mixture (i) comprising 50–99.99 wt % of an acrylic acid ester, and 49.99–0 wt % of another monofunctional monomer together with 0.01–10 wt % of a polyfunctional monomer capable of copolymerization with the acrylic acid ester, at least two of the rubber component phases (I) being mutually adjacent to each other and having mutually different monomer unit compositions, (3) the thermoplastic resin component phase (II) is formed by copolymerization of a monomer mixture (ii) comprising 40–99 wt % of a methacrylic acid ester, and 60–1 wt % of another monomer capable of copolymerization with the methacrylic acid ester, (4) the polymer which constitutes the phase situated in the outermost part among the thermoplastic resin component phases (II) has a number average molecular weight of 30,000 or less measured by the GPC method, (5) the ratio of the total weight of the rubber component phases (I) and the total weight of the thermoplastic resin component phase (II) is in the range of 30/70–80/20 expressed as phase (I)/phase (II), (6) the average particle diameter is 150 nm or less, (7) for all of those phases constituting the rubber component phases (I) which are mutually adjacent to each other, the absolute value of the difference of the solubility $A_n$ in water of the monomer mixture forming the nth phase from the innermost part, and the solubility $A_{n+1}$ in water of the monomer mixture forming the n+1th phase adjacent to it, is 0.36 or less (where $A_n$ is the sum of the products of the weight fraction of each monomer of the monomer mixture forming the nth phase and the solubility of the monomer in water at 20° C. (g/100 g $H_2O$), and $A_{n+1}$ is the sum of the products of the weight fraction of each monomer of the monomer mixture forming the n+1th phase and the solubility of the monomer in water at 20° C. (g/100 g $H_2O$), and (8) the absolute value of the difference of the refractive index $n_d(I)$ of any of the phases included in the rubber component phases (I), and the refractive index $n_d(II)$ of any of the phases included in the thermoplastic resin component phase (II), is less than 0.005 for all phase combinations.

Other objects of the invention as stated hereabove are achieved by (1) to provide a method of manufacturing multiphase structured polymer particles comprising at least three phases comprising at least two inner rubber component phases (I) which are mutually adjacent to each other and have mutually different monomer unit compositions, and at least one thermoplastic resin component phase (II) in at least the outermost part, by forming phases from the center part to the outer part by performing polymerization reaction steps (a) for forming the rubber component phases (I) and polymerization reaction steps (b) for forming the thermoplastic component phase (II) in a predetermined sequence, (2) in the polymerization reaction steps (a), copolymerizing a monomer mixture (i) comprising 50–99.99 wt % of an acrylic acid ester, and 49.99–0 wt % of another monofunctional monomer together with 0.01–10 wt % of a polyfunctional monomer capable of copolymerization with the acrylic acid ester, at least two of the polymerization reaction steps (a) being a series of polymerization reaction steps using mutually different monomer mixture (i), (3) in the polymerization reaction steps (a), selecting the type and amount of monomers in the monomer mixture so that, for all of those phases included in the rubber component phases (I) which are mutually adjacent to each other, the absolute value of the difference of the solubility $A_n$ in water of the monomer mixture forming the nth phase from the innermost part, and the solubility $A_{n+1}$ in water of the monomer mixture forming the n+1th phase adjacent to it, is 0.36 or less (where $A_n$ is the sum of the products of the weight fraction of each monomer of the monomer mixture forming the nth phase and the solubility of the monomer in water at 20° C. (g/100 g $H_2O$), and $A_{n+1}$ is the sum of the products of the weight fraction of each monomer of the monomer mixture forming the n+1th phase and the solubility of the monomer in water at 20° C. (g/100 g $H_2O$)), (4) in the polymerization reaction steps (b) copolymerizing a monomer mixture (ii) comprising 40–99 wt % of a methacrylic acid ester and 60–1 wt % of another monomer capable of copolymerization with this methacrylic acid ester, (5) in the polymerization reaction steps (b), performing a polymerization wherein a molecular weight adjusting agent is used in a proportion of 0.4–10 wt % relative to the monomer mixture (ii) at least in the polymerization reaction step for forming the thermoplastic resin component phase (II) of the outermost part, (6) selecting the type and amount of monomers forming the monomer mixture so that the absolute value of the difference of the refractive index $n_d(I)$ of any of the phases in the rubber component phase (I) and the refractive index $n_d(II)$ of any of the phases in the thermoplastic resin component phase (II) is less than 0.005 for all combinations of phases, (7) arranging the ratio of the total weights of the monomer mixture (i) and the monomer mixture (ii) used in all the polymerization reaction steps to be in the range of 30/70–80/20 expressed as monomer mixture (i)/monomer mixture (ii), and (8) arranging the average particle size of the multiphase structured polymer particles when all polymerization reaction steps are complete, to be 150 nm or less.

Another object of this invention as stated hereabove is to provide multiphase structured polymer particles obtained by the aforesaid method (referred to hereafter in some cases as "multiphase structured polymer particles (A')").

Another object of this invention as stated hereabove is achieved to provide a molding material comprising the aforesaid multiphase structured polymer particles (A) or (A'), and a film or sheet comprising the multiphase structured polymer particles (A) or (A').

DETAILED DESCRIPTION OF THE INVENTION

Hereafter, this invention will be described in more detail. The multiphase structured polymer particles (A) of this invention can be manufactured by the above manufacturing method, and in many cases, they overlap with the above multiphase structured polymer particles (A'). Therefore, provided there is no specification otherwise, the multiphase structured polymer particles of this invention described below will be assumed to refer to the multiphase structured polymer particles (A) and the multiphase structured polymer particles (A').

The multiphase structure polymer particles of this invention comprise at least two phases of a rubber component (I) which are mutually adjacent and have mutually different compositions, and at least one thermoplastic resin component phase (II) at least in the outermost part. The number of phases forming the multiphase structured polymer particles may be at least three, four or more. In the case of a triphase structure, the arrangement is phase(I)(innermost phase)/phase(I)(intermediate phase)/phase(II)(outermost phase), and in the case of a four phase structure, the arrangement may for example be phase(I)(innermost phase)/phase(I)(intermediate)/phase(II)(intermediate phase)/phase(II)(outermost phase), or phase(II)(innermost phase)/phase(I)(intermediate phase)/phase(I)(intermediate phase)/phase(II)(outermost phase). Of these, from the viewpoint of ease of handling, the triphase structure, phase (I)(innermost phase)/phase(I)(intermediate phase)/phase(II)(outermost phase) is preferable.

The total weight ratio of phase (I) and phase (II) is in the range 30/70 to 80/20 expressed as (I)/(II). If the proportion of phase (I) is lower than this range, elastic recovery properties of molded products obtained by molding the multiphase structured polymer particles are inadequate, and conversely, if the proportion of phase (I) is higher than this range, melt fluidity sharply decreases which has an adverse impact on moldability.

Phase (I) of the aforesaid multiphase structured polymer particles is a polymer phase having rubber elastic properties formed by copolymerization of a monomer mixture (i) comprising 50–99.9 wt % of an acrylic acid ester, and 49.99–0 wt % of another monofunctional monomer together with 0.01–10 wt % of a polyfunctional monomer capable of copolymerizing with this acrylic acid ester.

Specific examples of the acrylic acid ester used to form the phase (I) are alkyl esters of acrylic acid such as methyl acrylate, ethyl acrylate, n-propyl acrylate, isopropyl acrylate, n-butyl acrylate, isobutyl acrylate, s-butyl acrylate, t-butyl acrylate, pentyl acrylate, hexyl acrylate, octyl acrylate, 2-ethylhexyl acrylate, cyclohexyl acrylate, dodecyl acrylate and octadecyl acrylate; esters of acrylic acid and phenols such as phenyl acrylate; and esters of acrylic acid and aromatic alcohols such as benzyl acrylate. The acrylic acid ester is used either alone or two or more are mixed together in the range of 50–99.9 wt % relative to the monomer mixture (i) used to form the phase (I) (two or more phases (I) in the multiphase structured polymer particles). If the amount of acrylic acid ester is less than 50 wt %, the rubber elasticity of the multiphase structured polymer particles decreases, and if it exceeds 99.9 wt %, the phase structure of the multiphase structured polymer particles cannot be formed, both of which are undesirable.

The polyfunctional monomer used to form the phase (I) is a monomer having two or more carbon-carbon double bonds in the molecule, for example, esters of unsaturated carboxylic acids such as acrylic acid, methacrylic acid or cinnamic acid and unsaturated alcohols such as allyl alcohol or methallyl alcohol or glycols such as ethylene glycol or butanediol; and esters of dicarboxylic acids such as phthalic acid, terephthalic acid, isophthalic acid or maleic acid and the aforesaid unsaturated alcohols. Specific examples are allyl acrylate, methallyl acrylate, allyl methacrylate, methallyl methacrylate, allyl cinnamate, methallyl cinnamate, dially maleate, diallyl phthalate, diallyl terephthalate, diallyl isophthalate, divinylbenzene, ethylene di(meth)acrylate, butanediol di(meth)acrylate, and hexanediol di(meth)acrylate. Of these polyfunctional monomers, allyl methacrylate is particularly to be preferred. In the above, "di(meth)acrylate" is a general term referring to "diacrylate" and "dimethacrylate". The polyfunctional monomer is used either alone or two or more are used in combination in the range of 0.01–10 wt % relative to the monomer mixture: (i) used to form the phase (I). If the amount of polyfunctional monomer is greater than 10 wt %, the multiphase structured polymer particles no longer show rubber elasticity, and elastic recovery properties are inadequate which is undesirable. On the other hand, if the amount of polyfunctional monomer is less than 0.01 wt %, the phase (I) cannot be formed as a particle structure which is undesirable.

To form the phase (I), in addition to acrylic acid esters and polyfunctional monomers, other monofunctional monomers capable of copolymerization with acrylic acid esters may also be used concurrently. Typical examples of these other monofunctional monomers are methacrylic acid esters, e.g., alkyl esters of methacrylic acid such as methyl methacrylate, ethyl methacrylate, n-propyl methacrylate, isopropyl methadrylate, n-butyl methacrylate, isobutyl methacrylate, pentyl methacrylate, hexyl methacrylate, octyl methacrylate, 2-ethylhexyl methacrylate, cyclohexyl methacrylate, dodecyl methacrylate, myristyl methacrylate, palmityl methacrylate, stearyl methacrylate, behenyl methacrylate and octadecyl methacrylate; esters of methacrylic acid and phenols such as phenyl methacrylate, and esters of methacrylic acid and aromatic alcohols such as benzyl methacrylate, but other examples are aromatic vinyl monomers such as styrene, alpha-methylstyrene, 1-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene and halogenated styrenes; cyanated vinyl monomers such as acrylonitrile and methacrylonitrile; and conjugated diene monomers such as butadiene, isoprene, 2,3-dimethylbutadiene, 2-methyl-3-ethylbutadiene, 1,3-pentadiene, 3-methyl-1,3-pentadiene, 2-ethyl-1,3-pentadiene, 1,3-hexadiene, 2-methyl-1,3-hexadiene, 3,4-dimethyl-1,3-hexadiene, 1,3-heptadiene, 3-methyl-1,3-heptadiene, 1,3-octadiene, cyclopentadiene, chloroprene and myrcene. These monomers are either used alone, or two or more used in combination, in a proportion of 49.99 wt % or less relative to the monomer mixture (i) used to form the phase (I) as necessary. If the proportion of the above other monofunctional monomers exceeds 49.99 wt %, the weatherability of the multiphase structured polymer particles is inadequate which is undesirable.

In the multiphase structured polymer particles (A) of this invention, at least two of the rubber component phases (I) are mutually adjacent to each other and have mutually different monomer compositions. Herein, the term "monomer composition" signifies the type and quantitative proportion of the monomers forming the copolymer of the rubber component phases.

The phase (II) in the multiphase structured polymer particles is a polymer phase having thermoplastic properties formed by copolymerization of a monomer mixture (ii) comprising 40–99 wt % of a methacrylic acid ester and 60–1 wt % of another monomer capable of copolymerization with it. If the amount of methacrylic acid ester is less than 40 wt %, the weatherability of the multiphase structured polymer particles is inadequate, and if it is greater than 99 wt %, heat stability is inadequate.

Specific examples of the methacrylic acid ester used to form the phase (II) are methyl methacrylate, ethyl methacrylate, n-propyl methacrylate, isopropyl methacrylate, n-butyl methacrylate, isobutyl methacrylate, pentyl methacrylate, hexyl methacrylate, octyl methacrylate, 2-ethylhexyl methacrylate, cyclohexyl methacrylate, dodecyl methacrylate, myristyl methacrylate, palmityl methacrylate, stearyl methacrylate, behenyl methacrylate, octadecyl methacrylate, phenyl methacrylate and benzyl methacrylate, but methyl methacrylate is preferred.

Specific examples of the other monomer capable of copolymerization used to form the phase (II) are alkyl esters of acrylic acid such as methyl acrylate, ethyl acrylate, n-propyl acrylate, isopropyl acrylate, n-butyl acrylate, isobutyl acrylate, s-butyl acrylate, t-butyl acrylate, pentyl acrylate, hexyl acrylate, octyl acrylate, 2-ethylhexyl acrylate, cyclohexyl acrylate, dodecyl acrylate and octadecyl acrylate; aromatic vinyl monomers such as styrene, alpha-methylstyrene, 1-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene and halogenated styrenes; cyanated vinyl monomers such as acrylonitrile and methacrylonitrile; maleimide monomers such as maleimide, N-methylmaleimide, N-ethylmaleimide, N-propylmaleimide, N-isopropylmaleimide, N-cyclohexylmaleimide, N-phenylmaleimide, N-(p-bromophenyl)maleimide and N-(chlorophenyl)maleimide; and the polyfunctional monomers shown in the above example. Of these, alkyl esters of acrylic acid such as methyl acrylate, ethyl acrylate and n-butyl acrylate are preferred.

In the multiphase structured polymer particles (A) of the invention, it is important that the number average molecular weight of the copolymer forming at least the outermost phase of the particles in the phase (II) comprised therein is 30,000 or less based on measurement by GPC (gel permeation chromatography). If the number average molecular weight exceeds 30,000, elastic recovery properties of molded products obtained by forming the multiphase structured polymer particles are inadequate, and the melt fluidity may also decrease. Concerning the lower limit of number average molecular weight, this is not an absolute restriction, but from the viewpoint of passage through manufacturing steps, it is desirable that the number average molecular weight does not fall below 1,000. From the dual viewpoints of elastic recovery properties and passage through manufacturing steps, it is particularly preferred that the number average molecular weight is in the range 3,000–20,000.

The average particle size of the multiphase structured polymer particles of this invention is 150 nm or less. If it is larger than 150 nm, elastic recovery properties are inadequate. Concerning the lower limit of average particle size, there is no particular restriction, but from the viewpoint of ease of forming a predetermined phase structure of the multiphase structured polymer particles, it is preferred that the average particle size is at least 30 nm.

In the multiphase structured polymer particles (A) of this invention, in all of the phases of the rubber component phases (I) contained therein, it is important that the type and weight fractions of monomers in the monomer mixtures are selected so that the absolute value of the difference of the solubility $A_n$ in water of the monomer mixture in the nth phase and the solubility $A_{n+1}$ in water of the monomer mixture in the n+1th phase adjacent to it, is 0.36 or less.

$A_n$ is the sum of the products of the weight fraction of each monomer of the monomer mixture forming the nth phase and the solubility of the monomer in water at 20° C. (g/100 g $H_2O$), and $A_{n+1}$ is the sum of the products of the weight fraction of each monomer of the monomer mixture forming the n+1th phase and the solubility of the monomer in water at 20° C. (g/100 g $H_2O$).

If the absolute value of $A_n$-$A_{n+1}$ exceeds 0.36, the transparency of the molded products obtained by forming the multiphase structured polymer particles decreases.

In the multiphase structured polymer particles (A) of this invention, it is important that that the type and weight fractions of monomers in the monomer mixtures forming the phases are selected so that the absolute value of the difference of the refractive index $n_d$(I) of the copolymer of any of the phases (I) and the refractive index $n_d$(II) of the copolymer of any of the phases (II) is less than 0.005 for all combinations of the phases (I) and the phases (II).

It is desirable that the absolute difference $n_d$(I)-$n_d$(II) does not exceed 0.001. If the absolute value of $n_d$(I)-$n_d$(II) is 0.005 or greater, the transparency of molded products obtained by forming the multiphase structured polymer particles decreases.

The compositions of the monomers forming the phases (I) and the phases (II) are such that the phase (I) is formed from a polymer component having rubber elasticity, the phase (II) is formed from a polymer component having thermoplasticity, and the conditions can be suitably chosen experimentally within the range of types and usage proportions of the aforesaid monomers to satisfy the above conditions. Concerning the two or more rubber component phases in phase (I) which are mutually adjacent and have mutually different compositions, it is desirable, from the viewpoint of transparency of the multiphase structured polymer particles, that the types and amounts of monomers are adjusted so that a rubber component phase on the outside of a group of adjacent rubber component phases has a refractive index intermediate between the refractive index of the rubber component phase adjacent to it on the inside, and the refractive index of the adjacent thermoplastic resin component phase outside the outermost tubber component phase. It is also desirable, from the viewpoint of increasing the tensile strength of the molded products obtained, that in two adjacent rubber component phases (I), the weight fraction of the acrylic acid ester in the monomer mixture of the inner rubber component phase is lower than the weight fraction of acrylic acid ester in the monomer mixture of the outer rubber component phase.

The multiphase structured polymer particles of this invention can be manufactured by any known method for manufacturing multiphase structured polymer particles comprising three or more phases having at least two rubber component phases which are mutually adjacent and of mutually different compositions on the inside and at least one thermoplastic resin component phase in the outermost part, by progressively forming phases from the center towards the outside, by performing a polymerization reaction step to form a rubber component phase and a polymerization reaction step to form a thermoplastic resin phase in a predetermined sequence. Care must however be taken with regard to the following points.

(1) In the polymerization reaction steps (a) for forming the rubber component phases (I), the monomer mixture (i) comprising 50–99.99 wt % of an acrylic acid ester, and 49.99–0 wt % of another monofunctional monomer together with 0.01–10 wt % of a polyfunctional monomer capable of copolymerization with the acrylic acid ester, is copolymerized, and at least two of the polymerization reaction steps (a) is a sequence of polymerization steps using the monomer mixture (i) in which the monomer compositions are mutually different.

(2) In the polymerization reaction steps (a) for forming the rubber component phases (I), for all the phases in the rubber component phases (I) which are mutually adjacent, the type and amounts of the monomer mixtures are selected so that the absolute value of the difference of the solubility $A_n$ in water of the monomer mixture in the nth phase and the solubility $A_{n+1}$ in water of the monomer mixture in the n+1th phase adjacent to it, is 0.36 or less.

$A_n$ is the sum of the products of the weight fraction in each monomer of the monomer mixture forming the nth phase and the solubility of the monomer in water at 20° C. (g/100 g $H_2O$), and $A_{n+1}$ is the sum of the products of the weight fraction in each monomer of the monomer mixture forming the n+1th phase and the solubility of the monomer in water at 20° C. (g/100 g $H_2O$).

(3) In the polymerization reaction steps (b) for forming the thermoplastic resin component (II), the monomer mixture (ii) comprising 40–99 wt % of a methacrylic acid ester and 60–1 wt % of another monomer capable of copolymerization with this methacrylic acid ester, is copolymerized.

(4) Of the polymerization reaction steps (b), at least in the polymerization reaction step for forming the thermoplastic resin component phase in the outermost part, the polymerization reaction is performed using a molecular weight adjusting agent in a range of 0.4–10 wt % relative to the monomer mixture (ii).

(5) The type and amounts of monomers in the monomer mixture are selected such that the absolute value of the difference of the refractive index $n_d$(I) of all the phases in the rubber component phases (I), and the refractive index $n_d$(II) of all the phases in the thermoplastic resin component phase (II), is less than 0.005 for all phase combinations.

(6) The ratio of the total weight of the monomer mixture (i) and the total weight of the monomer mixture (ii) used in all polymer reaction steps is arranged to be in the range of 30/70–80/20 expressed as monomer mixture (i)/monomer mixture (ii).

(7) The average particle size of the multiphase structured polymer particles when all polymerization reaction steps are complete, is controlled to be 150 nm or less.

There is no particular limitation on the polymerization method used, and emulsion polymerization, soap-free emulsion polymerization, pre-emulsion polymerization, suspension polymerization, bulk polymerization, solution polymerization or a combination of these may for example be used according to the usual known polymerization techniques for manufacturing multiphase structured polymer particles.

For example, in emulsion polymerization, the multiphase structured polymer particles can be obtained by carrying out polymerization to form each phase according to known techniques. There is no particular limitation on the temperature of emulsion polymerization, but a general range is 0–100° C. The emulsifying agent used here may be an alkali metal salt of an aliphatic acid such as sodium oleate, sodium laurate or sodium stearate; a sulphuric acid ester salt of an aliphatic alcohol such as sodium lauryl sulphate; a rosin acid salt such as potassium rosinate; an alkylaryl sulfonic acid such as dodecylbenzene sulfonate; or a phosphoric acid ester salt such as sodium polyoxyethylenealkyl phosphate. These may be used alone, or two or more may be used in combination. The polymerization initiator used in emulsion polymerization is generally a radical polymerization initiator. Specific examples of the radical polymerization initiator are peroxides such as persulfuric acid salts, azo-bis-isobutyronitrile and benzoyl peroxide used alone. The radical polymerization initiator may also be a redox initiator formed by a combination of an organic hydroperoxide such as cumene hydroperoxide, di-isopropylbenzene hydroperoxide and paramenthane hydroperoxide with a reducing agent such as a transition metal salt.

As described above, predetermined polymerphases can be formed in stages from the center to the outside of the particles by sequentially polymerizing predetermined amounts of predetermined monomer mixtures according to known emulsion polymerization techniques. However, to manufacture the multiphase structured polymer particles of this invention, it is important that, in at least the polymerization reaction step for forming the outermost phase, a molecular weight adjusting agent is used in a proportion within a range of 0.4–10 wt % relative to the monomer mixture (ii) used in this step. Normally, in the manufacture of multiphase structured polymer particles, the amount of molecular weight adjusting agent used in the polymerization reaction for forming the thermoplastic resin component phase in the outermost part is usually of the order of 0–0.3 wt % relative to the monomer, but if the amount is less than 0.4 wt % in this case, the number average molecular weight of the thermoplastic resin component of this phase is too high, the elastic recovery properties of molded products obtained by forming the multiphase structured polymer particles are inadequate, and mold fluidity properties may also be inadequate. For the purpose of this invention, the amount of molecular weight adjusting agent is sufficient if it is 10 wt % at most. Even if a greater amount is used, there is no further improvement of elastic recovery properties, and as the residual amount of molecular weight adjusting agent in the multiphase structured polymer particles increases, it is undesirable.

Specific examples of the molecular weight adjusting agent are mercaptans such as n-octylmercaptan, t-octylmercaptan, n-dodecylmercaptan, t-dodecylmercaptan and mercaptoethanol; terpene mixtures of terpenolene, dipentene, t-terpenene and small amounts of other cyclic terpenes; and halogenated hydrocarbons such as chloroform and carbon tetrachloride. Of these, alkylmercaptans such as n-octylmercaptan are preferred.

The average particle diameter of the multiphase structured polymer particles obtained by emulsion polymerization is affected by polymerization conditions such as the addition amount of emulsifying agent, so the average particle size of the multiphase structured polymer particles which are finally obtained can easily be controlled to 150 nm or less by suitably selecting these conditions.

After emulsion polymerization, separation and extraction from the polymerization reaction system of the multiphase structured polymer particles so produced may also be performed according to known techniques, for example, acidification coagulation, salting out coagulation, spray drying or freeze coagulation may be used. It does not matter if there is some inter-particle adhesion between the separated, extracted multiphase structured polymer particles in the outermost phase comprising the thermoplastic resin component.

The multiphase structured polymer particles of this invention have thermoplasticity in the outermost phase, and can also be thermally molded on account of their excellent melt fluidity. By extrusion molding, variant extrusion, injection molding, blow molding, calendar shaping, compression molding, vacuum forming, foaming, two color molding with another resin, double phase shaping or composite molding at 180–280° C., for example, they can be molded into molded products of any shape such as powders, pellets, plates, films or sheets, pipes, hollow shapes or box shapes, or may be used as surface coatings for other materials. As the molded products have excellent elastic recovery properties and transparency, they may be conveniently be used as soft, transparent materials for applications such as soft parts of automobile interiors; electrical components such as switch covers and touch panels; optical sheets forming lens or prism patterns such as retroreflective sheets; packing films; desk mats; and cushions for covering indoor door packings and staircase rails.

As the multiphase structured polymer particles of this invention have thermoplasticity in the outermost phase, they can be used to form resin compositions of the multiphase structured polymer particles with synthetic resins, and as resin modifiers to improve the impact resistance of synthetic resins or the like.

When the multiphase structured polymer particles of this invention are formed, the particles may contain various other additives to the extent that these latter do not interfere with the advantages of the invention (e.g., rubbers, lubricants, antioxidants, plasticizers, light stabilizers, coloring agents, antistatic agents, flameproofing agents, etc.), or fillers (fiber reinforcing materials such as glass fiber and inorganic fillers). The rubber may for example be an acryl rubber; a styrene TPE (thermoplastic elastomer) such as SEPS, SEBS or SIS; or an olefin rubber such as IR, EPR or EPDM. The lubricant may for example be stearic acid, behenic acid, stearoamide acid, methylene-bis-stearoamide, hydroxystearic acid triglyceride, paraffin wax, ketone wax, octyl alcohol or hydrogenated oil. The antioxidant may for example be a phenol compound such as 2,6-di-t-butyl-4-methylphenol, stearyl-β-(3,5-di-t-butyl-4-hydroxyphenyl) propionate, or triethylene glycol-bis-3-(3-t-butyl-4-hydroxy-5-methylphenyl)propionate; or an amine compound such as N,N-di-2-napthyl-p-phenylenediamine. The plasticizer may for example be a phthalic acid ester such as di-2-ethylhexyl phthalate or dibutyl phthalate; a phosphoric acid ester; an adipic acid ester; or polyethylene glycol. The light stabilizer may for example be p-t-butylphenylsalicylate, 2,2'-dihydroxy-4-methoxybenzophenone, or 2-(2-hydroxy-4-n-octoxylophenyl)benzotriazole. The coloring agent may for example be titanium oxide, carbon black, or another inorganic or organic pigment. The antistatic agent may for example be stearoamidopropyldimethyl-β-hydroxyethyl ammonium nitrate. The flameproofing agent may for example be an organohalogen type flameproofing agent such as tetrabromo-bisphenol A, decabromodiphenyl oxide or a brominated polycarbonate; or a non-halogen type flameproofing agent such as antimony oxide, aluminium hydroxide, zinc borate or triglycyl phosphate.

EXAMPLES

This invention will now be described in further detail with reference to specific examples, but it should be understood that the invention is not limited thereto. The values in the examples were obtained by the following methods.

The average particle diameter of the multiphase structured polymer particles was found by measurement of a sample extracted from latex after completion of polymerization, using the dynamic light scattering technique with a laser particle diameter analyzer PAR-III (Otsuka Electronics Co., Ltd.), and analyzing by the cumulant method.

The tensile rupture strength, stretching rupture elongation, stress (100% modulus) at 100% elongation and permanent stretching elongation were measured according to JIS K 6301 using an Autograph AG-2000B (Shimadzu Co.).

Hardness was measured according to JIS K 6301 using an A type hardness meter (Oscar Inc.).

The number average molecular weight of the polymer component forming the outermost phase was measured by stirring a sample of multiphase structured polymer particles in toluene at room temperature to a sufficient extent, and applying GPC to the solution obtained by centrifugal separation.

The solubility in water at 20° C. of the monomer components (i) forming the rubber component phase (I) was methyl methacrylate, 1.6 g/100 g H$_2$O, n-butylacrylate, 0.08 g/100 g H$_2$O and styrene, 0.04 g/100 g H$_2$O.

The refractive indices of each phase were calculated by the additivity rule according to the copolymerization composition ratio using homopolymer values at 20° C. or 23° C. from "POLYMER HANDBOOK, 3rd Edition", VI/pp. 453–457, (Wiley Interscience, New York, 1989) (polymethylmethacrylate, 1.4893, poly-n-butylacrylate, 1.466, polystyrene, 1.59, polymethylacrylate, 1.472).

The haze and total light transmittance were measured according to JIS K 7105.

Example 1

2800 wt parts of distilled water, 8.4 wt parts of sodium dodecylbenzenesulfonate as emulsifier and 1.7 wt parts of sodium carbonate were added to a polymerization vessel fitted with a stirrer, condenser and dropping funnel in a nitrogen atmosphere, and the mixture heated to 80° C. to give a homogeneous solution. Next, at the same temperature, 0.7 wt parts of potassium peroxodisulfate were added, and a monomer mixture comprising 420 wt parts of n-butyl acrylate, 192.5 wt parts of methyl methacrylate, 87.5 wt parts of styrene, 2.8 wt parts of allyl methacrylate and 3.5 wt parts of sodium polyoxyethylene alkylphosphoric acid was dripped in for 60 minutes from the dropping funnel. After addition was complete, the reaction was continued for one hour at 80° C. to form the first phase. It was confirmed by gas chromatography that at least 99% of each monomer had been consumed.

Next, 0.35 wt parts of potassium peroxodisulphate were added to the copolymer latex obtained, and a monomer mixture comprising 280 wt parts of n-butyl acrylate, 14 wt parts of methyl methacrylate, 56 wt parts of styrene, 1.4 wt parts of allyl methacrylate, and 1.8 wt parts of sodium polyoxyethylene alkylphosphate was dripped in for 30 minutes from the dropping funnel. After addition was complete, the reaction was continued for one hour at 80° C. to form the second phase. It was confirmed by gas chromatography that at least 99% of the monomers had been consumed.

Next, 0.35 wt parts of potassium peroxodisulphate were added to the copolymer latex obtained, and a monomer mixture comprising 332.5 wt parts of methyl methacrylate, 17.5 wt parts of methyl acrylate, 3.5 wt parts of n-octylmercaptan and 1.8 wt parts of sodium polyoxyethylene alkylphosphate was dripped in for 30 minutes from the dropping funnel. After addition was complete, the reaction was continued for one hour at 80° C., and polymerization was completed by confirming, by gas chromatography, that at least 99% of the monomers had been consumed. This formed the third phase. The average particle size of the particles in the latex obtained was 100 nm.

Regarding the solubility in water of the monomer mixture used for the first phase of the multiphase structured polymer particles, $A_1$ was 0.6×0.08 (n-butyl acrylate)+0.275×1.6 (methyl methacrylate)+0.125×0.04 (styrene)=0.493, regarding the monomer mixture used for the second phase, $A_2$ was 0.8×0.08 (n-butylacrylate)+0.04×1.6 (methyl methacrylate)+0.16×0.04 (styrene)=0.134, and $|A_1-A_2|$ (absolute value of the difference of $A_1$ and $A_2$) was 0.359.

The difference of the refractive indices of the first phase and third phase of the multiphase structured polymer particles was 0.0005, and the difference of the refractive indices of the second phase and third phase was 0.0017.

This latex was freeze-coagulated by cooling for 24 hours at −30° C., and the coagulate was melted and extracted. After drying under reduced pressure for 2 days at 50° C., coagulated, powdered tri-phase polymer particles [A-1] were obtained.

A sheet of thickness 3.0 mm was prepared at 200° C. using a compacting machine from the powdered A-1 obtained, and various measurements were performed.

The measurement results obtained are shown in Table 2 and Table 3.

Examples 2–4 and Comparative Examples 1–5

Coagulated, powdered tri-phase polymer particles [A-2]–[A-4] and [B-1]–[B-5] were obtained by a polymerization reaction, coagulation and drying in an identical way to the aforesaid Example 1, except that the amount of sodium dodecylbenzenesulfonate added to the reaction system and the monomer mixture compositions used to form the phases shown in Table 1 were used.

A sheet of thickness 3.0 mm was prepared at 200° C. using a compacting machine from the powdered polymer particles obtained, and various measurements were performed.

The measurement results obtained are shown in Table 2 and Table 3.

TABLE 1

|  | Type | DBS Addition Amount (parts) | Monomer Composition of First Phase (parts) | Monomer Composition of Second Phase (parts) | Monomer Composition of Third Phase (parts) |
| --- | --- | --- | --- | --- | --- |
| Example 1 | [A-1] | 8.4 | MMA/BA/St/ALMA = 192.5/420/87.5/2.8 | MMA/BA/St/ALMA = 14/280/56/1.4 | MMA/MA/n-OM = 332.5/17.5/3.5 |
| Example 2 | [A-2] | 14 | MMA/BA/St/ALMA = 211.75/462/96.25/3.1 | MMA/BA/St/ALMA = 14/280/56/1.4 | MMA/MA/n-OM = 266/14/2.8 |

TABLE 1-continued

| | Type | DBS Addition Amount (parts) | Monomer Composition of First Phase (parts) | Monomer Composition of Second Phase (parts) | Monomer Composition of Third Phase (parts) |
|---|---|---|---|---|---|
| Example 3 | [A-3] | 8.4 | MMA/BA/St/ALMA = 105/490/105/2.8 | BA/St/ALMA = 297.5/52.5/1.4 | MMA/BA/n-OM = 304.5/45.5/3.5 |
| Example 4 | [A-4] | 8.4 | MMA/BA/St/ALMA = 39.06/504/86.94/2.5 | MMA/BA/St/ALMA = 3.5/297.5/49/1.4 | MMA/BA/n-OM = 365.4/54.6/4.2 |
| Comparative Example 1 | [B-1] | 8.4 | MMA/BA/St/ALMA = 175/420/105/2.8 | BA/St/ALMA = 280/70/1.4 | MMA/MA/n-OM = 332.5/17.5/3.5 |
| Comparative Example 2 | [B-2] | 8.4 | MMA/BA/St/ALMA = 140/420/140/2.8 | BA/St/ALMA = 270/80/1.4 | MMA/MA/n-OM = 332.5/17.6/3.5 |
| Comparative Example 3 | [B-3] | 8.4 | MMA/BA/St/ALMA = 192.5/420/87.5/2.8 | MMA/BA/St/ALMA = 14/280/56/1.4 | MMA/MA = 332.5/17.5 |
| Comparative Example 4 | [B-4] | 8.4 | MMA/BA/St/ALMA = 192.5/420/87.5/2.8 | MMA/BA/St/ALMA = 14/280/56/1.4 | MMA/MA/n-OM = 332.5/17.5/0.88 |
| Comparative Example 5 | [B-5] | 5.0 | MMA/BA/St/ALMA = 192.5/420/87.5/2.8 | MMA/BA/St/ALMA = 14/280/56/1.4 | MMA/MA/n-OM = 332.5/17.5/3.5 |

The symbols used in Table 1 are as follows.
Sodium dodecylbenzenesulfonate DBS
Methyl methacrylate MMA
Methyl acrylate MA
n-butyl acrylate BA
Styrene St
allyl methacrylate ALMA
n-octyl mercaptan n-OM

TABLE 2

Multiphase Structured Polymer Particles

| | Type | Phase Ratio: Phase 1/Phase 2/Phase 3 (wt %) | Solubility Difference of Phase 1 and Phase 2 | Refractive index difference of Phase 1 and Phase 3 | Refractive index difference of Phase 2 and Phase 3 | Number Average Molecular Weight of Outermost Phase | Average Particle Size (nm) |
|---|---|---|---|---|---|---|---|
| Example 1 | [A-1] | 50/25/25 | 0.359 | 0.0005 | 0.0017 | 10,000 | 100 |
| Example 2 | [A-2] | 55/25/20 | 0.359 | 0.0005 | 0.0017 | 10,000 | 90 |
| Example 3 | [A-3] | 50/25/25 | 0.228 | 0.0018 | 0.0017 | 10,000 | 100 |
| Example 4 | [A-4] | 45/25/30 | 0.079 | 0.0017 | 0.0027 | 10,000 | 100 |
| Comparative Example 1 | [B-1] | 50/25/25 | 0.382 | 0.0020 | 0.0023 | 10,000 | 95 |
| Comparative Example 2 | [B-2] | 50/25/25 | 0.305 | 0.0070 | 0.0059 | 10,000 | 98 |
| Comparative Example 3 | [B-3] | 50/25/25 | 0.359 | 0.0005 | 0.0017 | measurement impossible | 100 |
| Comparative Example 4 | [B-4] | 50/25/25 | 0.359 | 0.0005 | 0.0017 | 35,000 | 95 |
| Comparative Example 5 | [B-5] | 50/25/25 | 0.359 | 0.0005 | 0.0017 | 11,000 | 170 |

TABLE 3

Physical property measurement results

| | Permanent stretching elongation (%) | Hardness (JIS A) | Tensile strength (Mpa) | 100% modulus (Mpa) | Stretching elongation (%) | Haze (%) | Total light transmittance (%) |
|---|---|---|---|---|---|---|---|
| Example 1 | 10 | 70 | 10 | 4.5 | 230 | 0.3 | 92.5 |
| Example 2 | 10 | 68 | 9 | 4.0 | 250 | 0.4 | 92.1 |
| Example 3 | 14 | 60 | 12 | 5.5 | 230 | 0.6 | 91.8 |
| Exmaple 4 | 11 | 73 | 11 | 5.0 | 240 | 0.5 | 92.0 |
| Comparative Exmaple 1 | 15 | 71 | 13 | 3.5 | 240 | 3.0 | 90.8 |
| Comparative Example 2 | 25 | 71 | 13 | 4.5 | 220 | 11.5 | 74.6 |
| Comparative Example 3 | 60 | 94 | 15 | 9.0 | 200 | 0.3 | 92.5 |
| Comparative Example 4 | 50 | 91 | 14 | 8.5 | 200 | 0.3 | 92.5 |
| Comparative Example 5 | 55 | 87 | 14 | 7.0 | 200 | 0.4 | 92.1 |

In the above Table 2, the mention "measurement impossible" in "number average molecular weight" of "multiphase structured polymer particles" means that the number average molecular weight could not be measured by the GPC method under these conditions as the molecular weight was too high.

From the above Table 3, it can be seen that the multiphase structured polymer particles according to this invention which are obtained when the difference of solubility in water of the monomer mixtures forming the adjacent rubber component phases (I) and the difference of refractive indices of the rubber component phases (I) and thermoplastic resin component phases (II) in Examples 1–4 satisfy specific conditions, had much improved transparency compared to the multiphase structured polymer particles of Comparative Examples 1 and 2 which did not satisfy these specific conditions. It can also be seen that, for the multiphase structured polymer particles according to this invention obtained when a specific molecular weight adjusting agent was used, as the permanent stretching elongation is small, elastic recovery properties are much improved compared to the multiphase structured polymer particles of Comparative Examples 3 to 5 which differ from those of this invention in the number average molecular weight and average particle size of the polymer components forming the outermost phase. Further, it can be seen that, as the multiphase structured polymer particles of this invention obtained in examples 1–4 have excellent flexibility, low tensile strength and high stretching ductility, their mechanical properties are also very good.

What is claimed is:

1. (1) Multiphase structured polymer particles comprising at least three phases comprising at least two of the following inner rubber component phases (I), and at least one of the following thermoplastic resin component phases (II) in at least the outermost part, wherein:

(2) the rubber component phases (I) are polymer phases formed by copolymerization of a monomer mixture (i) comprising 50–99.99 wt % of an acrylic acid ester, and 49.99–0 wt % of another monofunctional monomer together with 0.01–10 wt % of a polyfunctional monomer capable of copolymerization with the acrylic acid ester, at least two of the rubber component phases (I) being mutually adjacent to each other and having mutually different monomer unit compositions, (3) the thermoplastic resin component phase (II) is formed by copolymerization of a monomer mixture (ii) comprising 40–99 wt % of a methacrylic acid ester, and 60–1 wt % of another monomer capable of copolymerization with the methacrylic acid ester, (4) the polymer which constitutes the phase situated in the outermost part among the thermoplastic resin component phases (II) has a number average molecular weight of 30,000 or less measured by the GPC method, (5) the ratio of the total weight of the rubber component phases (I) and the total weight of the thermoplastic resin component phase (II) is in the range of 30/70–80/20 expressed as phase (I)/phase (II), (6) the average particle diameter is 150 nm or less, (7) for all of those phases constituting the rubber component phases (I) which ate mutually adjacent to each other, the absolute value of the difference of the solubility $A_n$ in water of the monomer mixture forming the nth phase from the innermost part, and the solubility $A_{n+1}$ in water of the monomer mixture forming the n+1th phase adjacent to it, is 0.36 or less (where $A_n$ is the sum of the products of the weight fraction of each monomer in the monomer mixture forming the nth phase and the solubility of the monomer in water at 20° C. (g/100 g $H_2O$), and $A_{n+1}$ is the sum of the products of the weight fraction of each monomer in the monomer mixture forming the n+1th phase and the solubility of the monomer in water at 20° C. (g/100 g $H_2O$), and (8) the absolute value of the difference of the refractive index $n_d(I)$ of any of the phases in the rubber component phases (I), and the refractive index $n_d(II)$ of any of the phases in the thermoplastic resin component phase (II), is less than 0.005 for all phase combinations.

2. Multiphase structured polymer particles as defined in claim 1 having a tri-phase structure, i.e., phase(I) (innermost phase)/phase (I)(intermediate phase)/phase(II)(outermost phase).

3. (1) A method of manufacturing multiphase structured polymer particles comprising at least three phases comprising at least two inner rubber component phases (I) which are mutually adjacent to each other and have mutually different monomer unit compositions, and at least one thermoplastic resin component phase (II) in at least the outermost part, by forming phases from the center part to the outer part by performing polymerization reaction steps (a) for forming the rubber component phases (I) and polymerization reaction steps (b) for forming the thermoplastic component phase (II) in a predetermined sequence, (2) in the polymerization reaction steps (a), copolymerizing a monomer mixture (i) comprising 50–99.99 wt % of an acrylic acid ester, and 49.99–0 wt % of another monofunctional monomer together with 0.01–10 wt % of a polyfunctional monomer capable of copolymerization with the acrylic acid ester, at least two of the polymerization reaction steps (a) being a series of polymerization reaction steps using mutually different monomer mixture (i), (3) in the polymerization reaction steps (a), selecting the type and amount of monomers in the monomer mixture so that, for all of those phases included in the rubber component phases (I) which are mutually adjacent to each other, the absolute value of the difference of the solubility $A_n$ in water of the monomer mixture forming the nth phase from the innermost part, and the solubility $A_{n+1}$ in water of the monomer mixture forming the n+1th phase adjacent to it, is 0.36 or less (where $A_n$ is the sum of the products of the weight fraction of each monomer in the monomer mixture forming the nth phase and the solubility of the monomer in water at 20° C. (g/100 g $H_2O$), and $A_{n+1}$ is the sum of the products of the weight fraction of each monomer in the monomer mixture forming the n+1th phase and the solubility of the monomer in water at 20° C. (g/100 g $H_2O$)), (4) in the polymerization reaction steps (b), copolymerizing a monomer mixture (ii) comprising 40–99 wt % of a methacrylic acid ester and 60–1 wt % of another monomer capable of copolymerization with these methacrylic acid esters, (5) in the polymerization reaction steps (b), performing a polymerization wherein a molecular weight adjusting agent is used in a proportion of 0.4–10 wt % relative to the monomer mixture (ii) at least in the polymerization reaction step for forming the thermoplastic resin component phase (II) of the outermost part, (6) selecting the type and amount of monomers forming the monomer mixture so that the absolute value of the difference of the refractive index $n_d(I)$ of any of the phases in the rubber component phase (I) and the refractive index $n_d(II)$ of any of the phases in the thermoplastic resin component phase (II) is less than 0.005 for all combinations of phases, (7) arranging the ratio of the total weight of the monomer mixture (i) and the monomer mixture (ii) used in all the polymerization reaction steps to be in the range of 30/70–80/20 expressed as monomer mixture (i)/monomer mixture (ii), and (8) arranging the average particle size of the multiphase structured polymer particles when all polymerization reaction steps are complete, to be 150 nm or less.

4. A manufacturing method as defined in claim 3, wherein the molecular weight adjusting agent is an alkyl mercaptan.

5. Multiphase structured polymer particles obtained by a manufacturing method as defined in claim 3.

6. A shaping material comprising multiphase structured polymer particles as defined in claim 1 or 5.

7. A film or sheet comprising multiphase structured polymer particles as defined in claim 1 or 5.

* * * * *

UNITED STATES PATENT AND TRADEMARK OFFICE
CERTIFICATE OF CORRECTION

PATENT NO. : 6,348,542 B1
DATED : February 19, 2002
INVENTOR(S) : Naruse et al.

It is certified that error appears in the above-identified patent and that said Letters Patent is hereby corrected as shown below:

<u>Title page,</u>
Item [30], the Foreign Application Priority information is missing. It should read
-- [30]      Foreign Application Priority Data
Oct. 12, 1999    (JP)………………………………….. 11-289329 --

Signed and Sealed this

Twenty-fourth Day of September, 2002

*Attest:*

*Attesting Officer*

JAMES E. ROGAN
*Director of the United States Patent and Trademark Office*